Jan. 16, 1968     C. L. STEC, SR     3,363,300

METHOD OF MAKING GAS LUBRICATED BEARINGS

Filed Oct. 27, 1964

INVENTOR.
CHARLES LEON STEC, SR. DEC.
BY RUTH DOROTHEA STEC,
ADMIN.

ATTYS.

United States Patent Office 3,363,300
Patented Jan. 16, 1968

3,363,300
METHOD OF MAKING GAS LUBRICATED BEARINGS
Charles Leon Stec, Sr., deceased, late of Arlington County, Va., by Ruth Dorothea Stec, administratrix, 2725 N. Nelson St., Arlington County, Va. 22207
Filed Oct. 27, 1964, Ser. No. 406,946
1 Claim. (Cl. 29—149.5)

ABSTRACT OF THE DISCLOSURE

A method of manufacturing a glass air bearing in which a housing is placed around a heated shaft and molten glass is poured in the housing and surrounds the shaft. As the assembly is cooled the differential thermal expansion rates of the shaft and the glass provide a pre-determined clearance between the shaft and the glass bearing.

The invention described herein may be manufactured and used by or for the Government of the United States of America for governmental purposes without the payment of any royalties thereon or therefor.

The present invention relates to bearings and more particularly to a method of making gas lubricated bearings which do not require all the elements of the bearing to be machined to close tolerances.

Very briefly it is well known that it is difficult and expensive to machine mating parts to close tolerances in their dimensions. Additionally, devices having parts which require close tolerances in their dimensions are difficult to repair, at best and usually have to be discarded if they become worn.

The present invention overcomes these difficulties in gas lubricated bearings by utilizing the thermal responsive expansion characteristics of the materials comprising the mating members of the bearing for providing the necessary clearance between the various parts of the bearing. The bearings are manufactured by heating a shaft to a predetermined temperature and then mounting the heated shaft in a circular housing having a larger diameter.

Glass or other material is cast in the space between the heated shaft and the circular housing. The unit is cooled and the shaft is permitted to shrink to provide the necessary clearance.

An object of the invention is to provide a method of making a gas lubricated bearing having a controlled amount of clearance between a nonmachined element and a machined element.

Another object of the invention is to provide a method of making a gas lubricated bearing which can be repaired after it becomes worn.

A further object of the invention is to provide a method of making a gas lubricated bearing which can be repaired in place without dismounting the bearing.

Still another object of the invention is to provide a method of making a gas lubricated bearing having a cast insert.

Yet another object of the invention is to provide an economical method of making a gas lubricated bearing containing elements having close tolerances in their dimensions.

Figure 1:
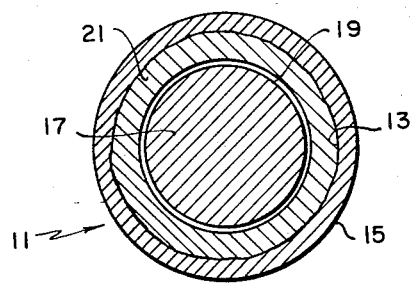
Figure 2:
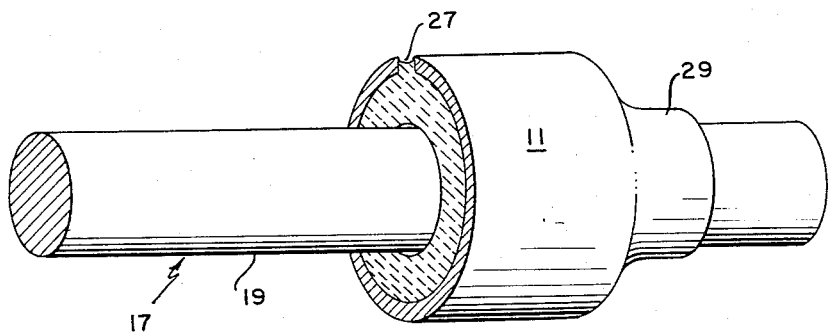

Other objects and many of the attendant advantages of this invention will be readily appreciated as the same becomes better understood by reference to the following detailed description when considered in connection with the accompanying drawings wherein:

FIG. 1 is a sectional view of a gas lubricated bearing embodying the invention; and FIG. 2 illustrates a side elevation partly in section of the gas lubricated bearing shown in FIG. 1.

Referring to FIGS. 1 and 2 simultaneously a metal housing 11 has an unmachined inner surface 13 and an outer surface 15. A metallic shaft 17 is concentrically mounted within the housing 11 and contains an accurately machined outer surface 19. The metallic shaft 17 may be made out of any suitable metal. Satisfactory metals are carbon steel, stainless steels, or bronze. An inner sleeve member 21 is cast between the housing 11 and the metallic shaft 17 by a method to be described below. The sleeve member 21 can be made out of any suitable material having the proper thermal coefficient of expansion. A suitable family of materials are the various types of glasses which can have a slightly negative, zero, or positive thermal coefficient of expansion or a family of resins called organopolysiloxane resins or substituted siloxane resins. Organopolysiloxane resins and substituted siloxane resins are sold by Owens-Illinois Glass Company under the trade name of "Glass Resins" and are described in the publication called "Glass Resins" published by Owens-Illinois Technical Center, 1700 N. Westwood, Toledo 7, Ohio, copyright in 1963. The particular type of glass of "Glass Resin" utilized for the sleeve member 21 is determined by the amount of clearance necessary between the metallic shaft 17 and sleeve member 21 through the range of temperature encountered by the bearing during its operation. Gas lubricated bearings may have clearances of from 40 microns to 4 mils. A typical gas lubricated bearing will have a clearance of about 100 microns between the metallic shaft 17 and the sleeve member 21.

This bearing will have a bearing surface area of one square inch, run at 1500 inches per second while carrying a load of up to 10 lbs. Gas lubricated bearings can rotate at speeds in excess of 20,000 r.p.m. If air is used as the lubricating gas, the viscosity at room temperature will be about $2.6 \times 10^{-9}$ lbs. seconds per square inch.

The housing 11 contains an opening 27 through which the liquid glass or "Glass Resin" is pumped into the cavity formed between the housing 11 and the metallic shaft 17. The housing 11 contains a first tapered end portion 29 for containing the sleeve member when it is in its liquid form. A second tapered end portion of the housing which is not illustrated is located on the other end of the housing for containing the sleeve member when it is in its liquid form.

The gas lubricated bearing illustrated in FIGS. 1 and 2 is manufactured as follows: a suitable metal is chosen to be machined into a shaft 17. The surface of the shaft 17 is accurately machined to the required diameter. A housing 11 is cast having an inner surface 13 which is not machined. The shaft is inserted within the housing 11 and heated to a predetermined temperature. Liquid glass is injected into the opening 27 completely filling the space between the inner surface 13 of housing 11 and the shaft 17. Generally it is not necessary for a parting material to be placed on the surface of the metal shaft 17, because the glass will normally adhere more strongly to the surface having the larger surface area. In this case that is the inner surface 13 of the housing 11. However, any well known parting material may be placed on the metal shaft if desired. The unit comprising the metallic shaft 17, housing 11 and glass sleeve member 21 is allowed to cool. The metal shaft 17 upon cooling will shrink away from the glass sleeve member providing the necessary clearance. If a zero thermal coefficient of expansion glass is utilized then the amount of clearance provided will be determined by the shrinkage of the metal shaft 17. However, if a greater clearance is desired then a glass having a positive thermal coefficient of expansion is utilized to form the sleeve member 21. The amount of clearance provided in this case is determined by the amount of shrinkage of the metal shaft added to the amount of shrinkage of the glass sleeve member. In certain applications a material known by the name "Glass Resins" has been utilized as the material for making the sleeve member 21. If "Glass Resins" are used then a thin layer of parting material is coated on the shaft 17. Then the shaft is heated to a predetermined temperature. The "Glass Resin" is injected into the cavity created by the metal shaft 17 and housing 11. The whole unit is placed into a curing oven which is preheated to a suitable temperature for example 90 degrees centigrade and allowed to cure for a suitable period of time for example 24 hours.

Obviously many modifications and variation of the present invention are possible in the light of the above teachings. It is therefore to be understood that within the scope of the appended claim the invention may be practiced otherwise than as specifically described.

What is claimed is:

1. A method of making a gas lubricated bearing having a shaft surrounded by a housing comprising the steps of:

heating a metal shaft to a predetermined temperature;

coating said metal shaft with a parting compound;

injecting liquid organopolysiloxane resin into the cavity formed by said heated metal shaft and said housing for casting a sleeve member between said heated shaft and said housing; and curing said organopolysiloxane resin at approximately 90 degrees centigrade for approximately 24 hours.

References Cited

UNITED STATES PATENTS

| | | | |
|---|---|---|---|
| 415,694 | 11/1889 | Bastian | 29—203 |
| 1,175,288 | 3/1916 | Patrick | 308—72 X |
| 1,980,081 | 11/1934 | Ovington | 308—238 |
| 2,427,203 | 9/1947 | Essig | 29—149.5 X |
| 2,641,828 | 6/1953 | Knoblaugh | 29—149.5 X |
| 2,877,537 | 3/1954 | Murdock et al. | 29—149.5 |

THOMAS H. EAGER, *Primary Examiner.*